Oct. 2, 1934.  E. UHER  1,975,439

PHOTOGRAPHIC TYPE COMPOSING

Filed Feb. 2, 1933  5 Sheets-Sheet 1

E. Uher
INVENTOR

By Marko & Clark
Attys.

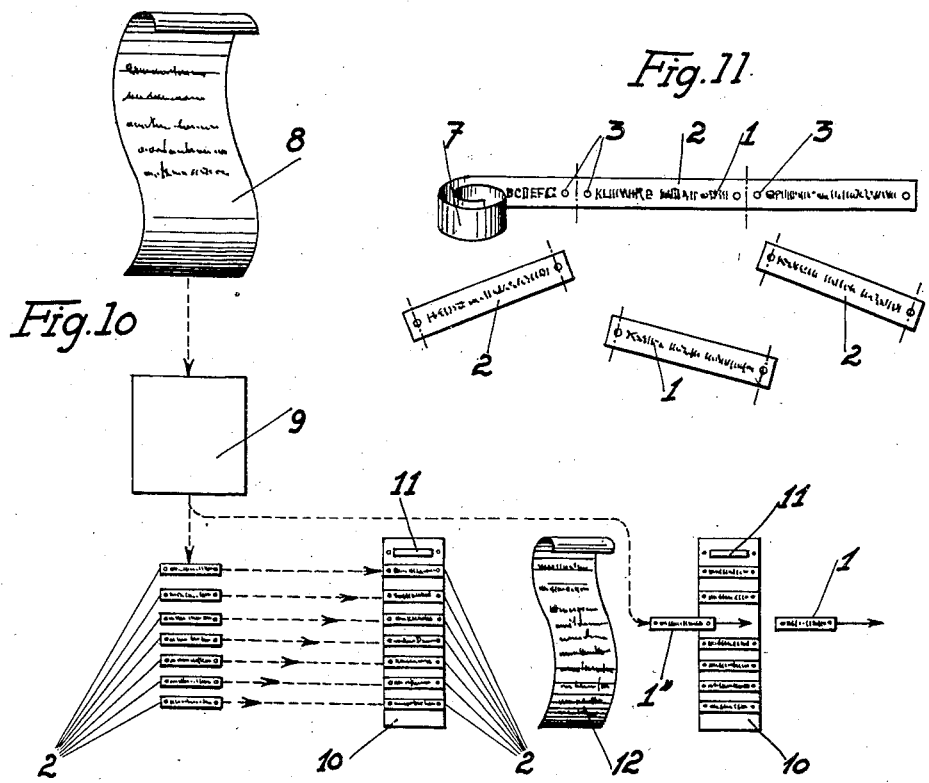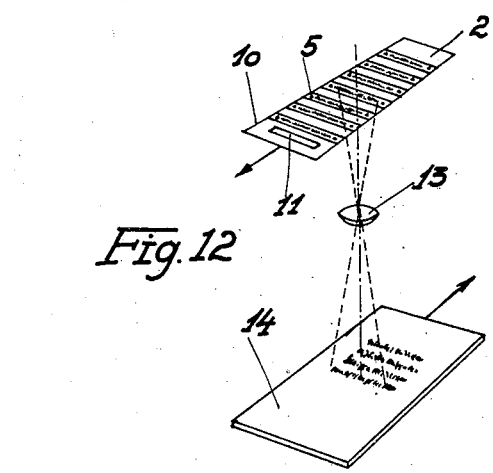

Oct. 2, 1934.  E. UHER  1,975,439

PHOTOGRAPHIC TYPE COMPOSING

Filed Feb. 2, 1933  5 Sheets-Sheet 3

E. Uher
INVENTOR

By Marks & Clark

Oct. 2, 1934.  E. UHER  1,975,439
PHOTOGRAPHIC TYPE COMPOSING
Filed Feb. 2, 1933  5 Sheets-Sheet 4
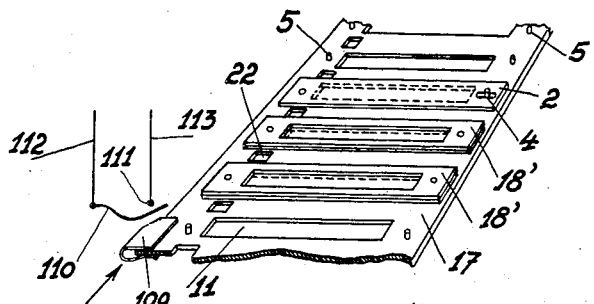
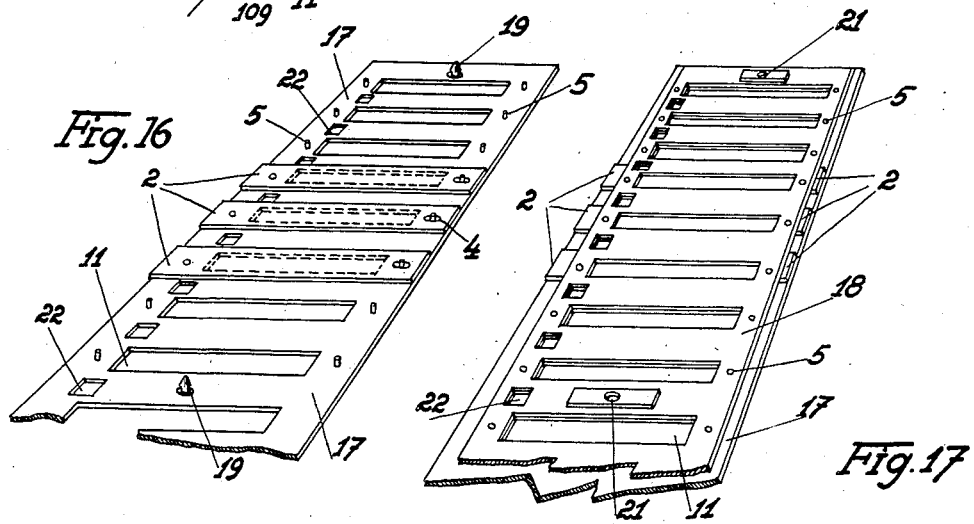
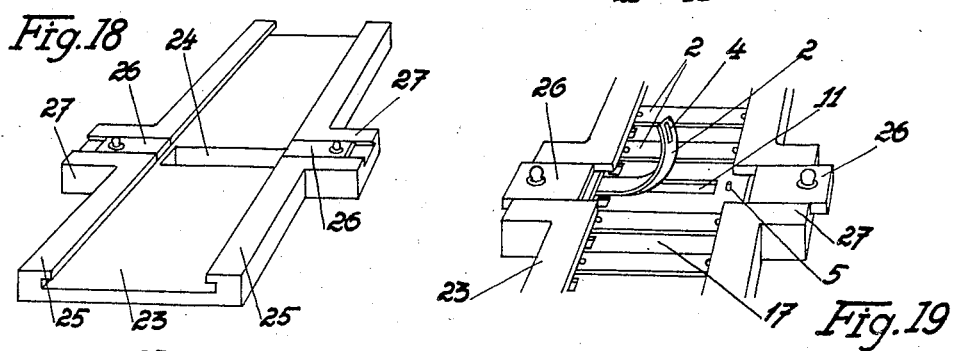
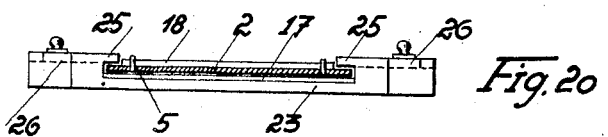
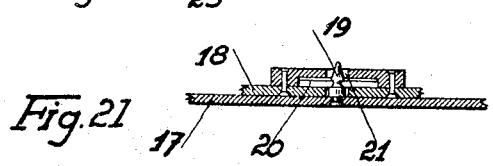

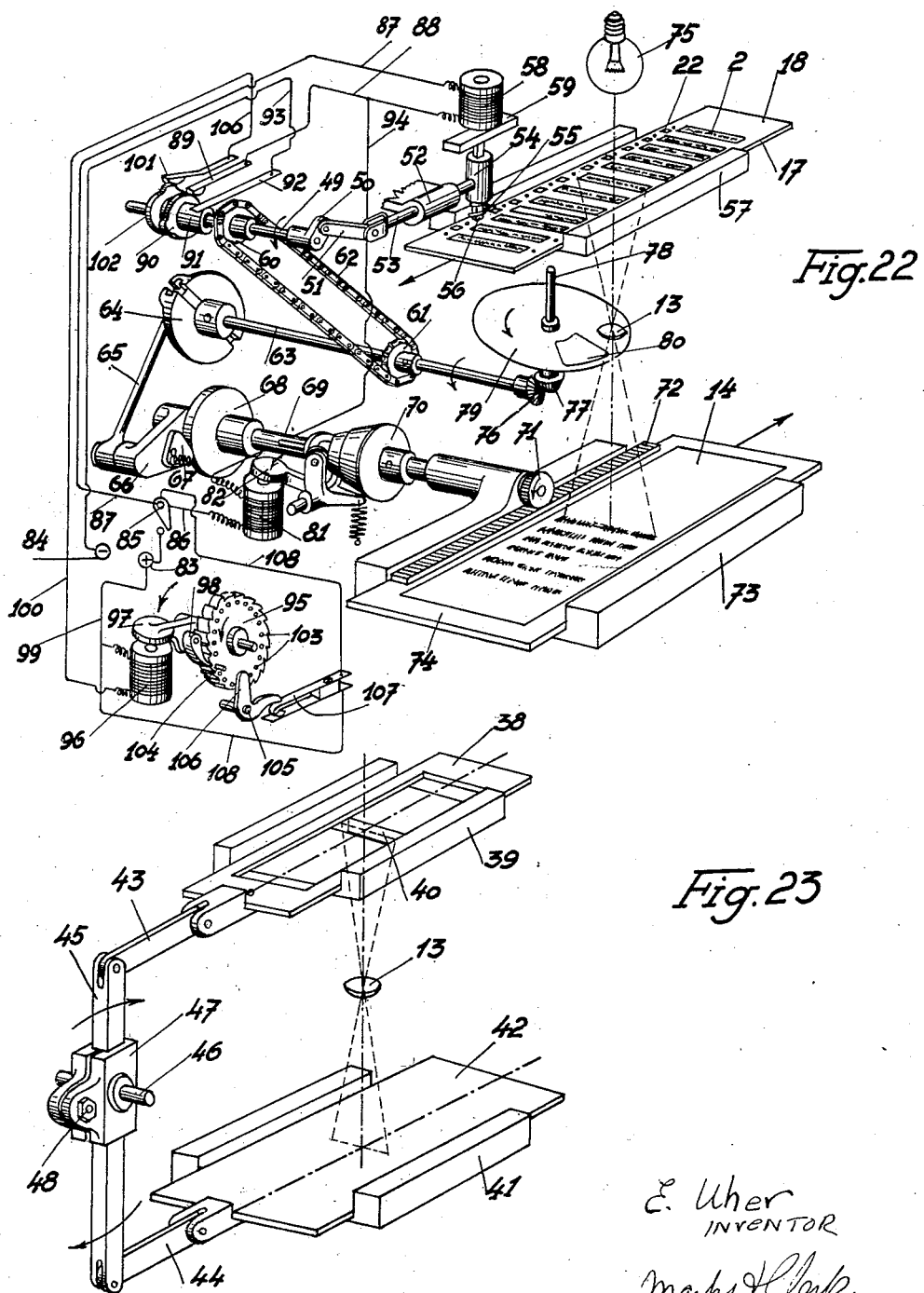

Patented Oct. 2, 1934

1,975,439

UNITED STATES PATENT OFFICE 1,975,439

PHOTOGRAPHIC TYPE COMPOSING

Edmond Uher, Augsburg, Germany, assignor to The Firm Uhertype A. G., Glarus, Switzerland Application February 2, 1933, Serial No. 654,967
In Germany February 9, 1932

42 Claims. (Cl. 95—4.5)

This invention relates to methods of and means for photographic type composing, and in particular to that kind of photographic type composing in which the photographic image of the impression surface is photographically produced by means of individual reproductions of making-up units which in themselves are already prepared for printing. The invention is not concerned with the manner in which the printing formes are then produced from the photographic impression surface images obtained.

The object of the invention is to provide the making-up units with fitting means.

Another object of the invention is to enable the carriers of the making-up units to expand freely.

Another object of the invention is to provide the making-up unit carriers with manipulating means and with controlling means.

A further object of the invention is to manipulate the making-up units with their fitting means, and also to introduce them photographically into the photographic image of the impression surface.

Another object of the invention is to mechanize the manipulation of the making-up units.

Yet another object of the invention is to subdivide the originally collective light-sensitive carrier of a plurality of making-up units, and to link this subdivision with the provision of manipulating and controlling means of the making-up unit carriers.

Another object of the invention is to provide for the individual photographic elaboration of the making-up unit carriers.

Yet another object of the invention is to provide for the collection and storage of a plurality of associated making-up unit carriers.

Another object of the invention is to provide for the photographic assembling and variation of making-up units or parts of making-up units when they are being exposed.

A further object of the invention is to limit the photographic enlargement or reduction of the making-up units when they are being reproduced.

Another object of the invention is to pre-arrange the making-up unit carriers, and to reproduce pre-arranged making-up units as proof impressions.

Yet a further object of the invention is to provide a device for pre-arranging the making-up unit carriers.

Another object of the invention is to construct forward feeding means, and also manipulating and controlling means on the pre-arrangers of making-up unit carriers.

Another object of the invention is to sub-divide the said pre-arrangers.

Another object of the invention is to provide a device for supervising the said pre-arranger or the pre-arranged making-up units.

Another object of the invention is to equip the aforesaid pre-arrangers with positions for removing and subsequently inserting individual making-up unit carriers.

Still another object of the invention is to provide a device for the photographic reproduction of the making-up units as photographic images of the impression surface.

Another object of the invention is to equip the said reproduction devices with means for adjustment, and also for feeding forward the making-up unit carriers, and to equip the same with a plurality of projection windows.

Another object of the invention is to mechanize the said reproduction device concerning the forward feeding of the aforementioned pre-arranger, and also concerning the automatic stoppage thereof.

A further object of the invention is to establish a positive connection between the feeding phase of the said pre-arranger and the stoppage of this feeding, and also to establish another positive connection between the feeding of this pre-arranger and the feeding of the light-sensitive forme carrier.

Another object of the invention is to stop the feeding of the said pre-arranger without interrupting the continuous drive thereof.

Still another object of the invention is to provide an adjustable screen for covering the ends or other positions of making-up units.

Further details of the invention will appear in the course of the following description.

Examples of the method and means for photographic type composing according to the invention are diagrammatically illustrated in the accompanying drawings, in which Figure 1 shows a plan of a making-up unit carrier embodied in the form of a narrow piece of film strip;

Figure 8:
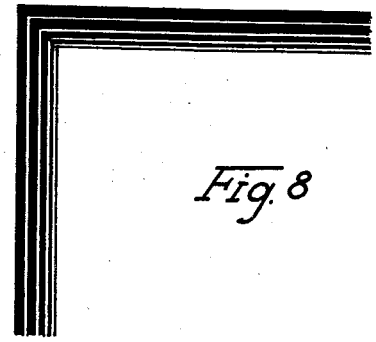
Figure 9:
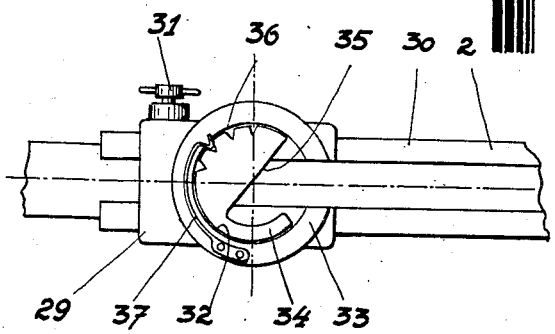
Figure 13:
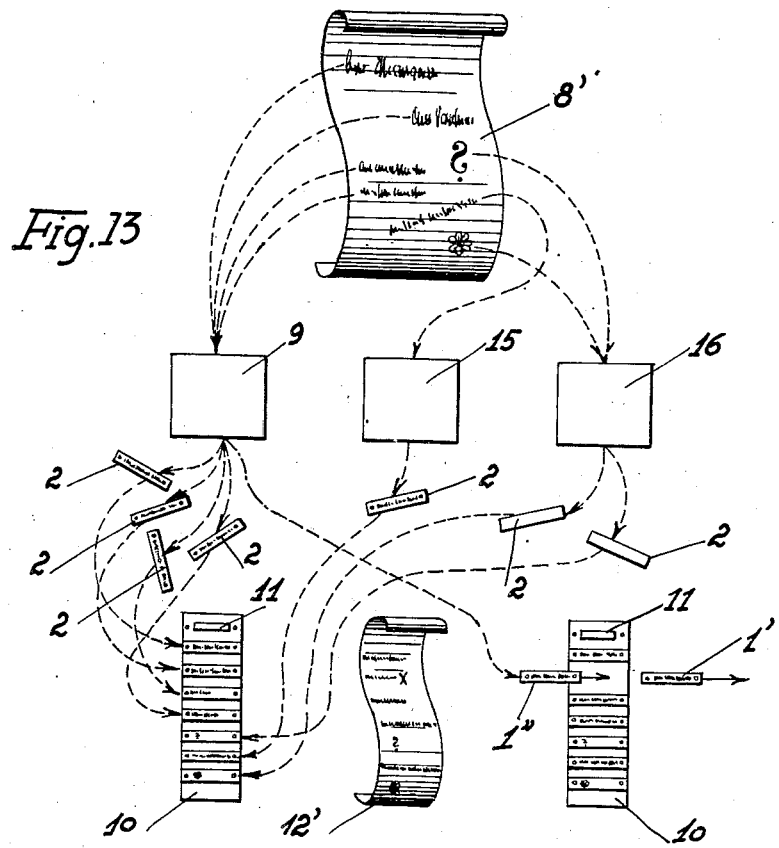
Figure 14:
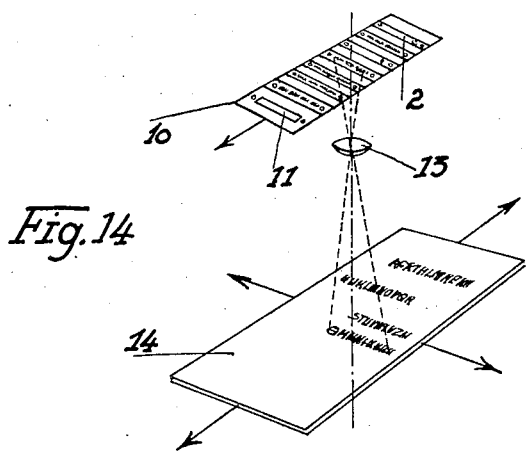

Figure 8 reproduces the broken impression of a corner tail piece;

Figure 9 shows in plan an adjustable screen for covering making-up units;

Figure 10 indicates the series of operations involved in producing a pre-arranged piece of bookwork, showing the various stages from the manuscript onwards;

Figure 11 is a diagrammatic perspective view indicating the subdivision of a primary forme product into individual making-up unit carriers;

Figure 12 is a perspective diagram of the stepwise photographic reproduction of a pre-arranged piece of bookwork obtained according to Figure 10;

Figure 13 indicates the scheme of operation of a pre-arranged piece of jobwork in its successive stages, starting from the manuscript or from the rough draft;

Figure 14 is a diagram in perspective of the stepwise photographic reproduction of a pre-arranged piece of jobwork obtained according to Figure 13;

Figure 15 is a broken perspective view of a strip-like pre-arranger of making-up unit carriers;

Figures 16 and 17 are similar perspective views of strip-like pre-arrangers of making-up unit carriers;

Figure 16 showing it with the cover strip removed, and Figure 17 with the cover strip put on.

Figure 18 is a perspective view of a guide for pre-arrangers of making-up unit carriers;

Figure 19 shows in perspective the central portion of the guide shown in Figure 18, together with a pre-arranger in the position in which a making-up unit carrier is exchanged;

Figure 20 is an end view of the guide shown in Fig. 19;

Figure 21 is a partial longitudinal section of the connecting button of pre-arranger halves on a larger scale, and Figures 22 and 23 are perspective diagrams of two different mechanized arrangements for the photographic individual reproduction of making-up units.

The elementary problems of photographic type composing are already solved, but the mere photographic forme, produced by photographic means, justified and also corrected, is still in practice by no means ready for printing, because in reality even the smoothest bookwork in itself ready for printing, still needs many successive arranging and equipping operations before a photographic image of the forme surface, capable of being used, can be composed therefrom. A few suggestions for the making-up of a primary photographic forme product by photographic means are indeed known, but they are limited to merely mechanizing the feeding of crude bookwork products, as they endeavor to attain the desired mechanical conveniences by violating one or other of the fundamental rules of typography.

Amongst others for example a suggestion has been made according to which indiarubber bands lettered by means of a typewriter are then stretched to the same length for purposes of justification, and finally a whole column composed of the stretched indiarubber bands is photographed all at once. This process suffers from the important disadvantage that the typewriter script is altogether distorted by the stretching of the indiarubber strips. The lines undergo unequal distortions, because pieces of indiarubber strip of different lengths, of lines which in the crude condition differ in length, are so stretched as to increase their lengths by different amounts, in which case the indiarubber strips become partly concave, and partly convex in a transverse direction. A further distortion originates from the fact that the columns cannot be photographed with the requisite accuracy. Again other photographic difficulties arise from the circumstances that the indiarubber bands are opaque, and therefore do not admit of being illuminated by transmitted light, and furthermore the margins thereof exert a disturbing action on the photographs. The reproductions cannot be reliably repeated on account of the numerous complexities connected with the stretching of the indiarubber bands, and also on account of the many undesired distortions, which cannot be calculated in advance at all. The typewriter script is moreover never accurate enough from a typographic point of view.

The object of the invention is to bring the photographic data of photographic type composing into complete harmony with the fundamental data of typography, and to present measures, which cover the entire operation of photographic type composing from the very beginning right to production of the photographic image of the face of the forme ready for use, which in particular yield the mobility, convertibility, and divisibility, and micrometrically exact capacity for being assembled of the photographic forme, which have hitherto been lacking, right into the smallest elements thereof, so that they present right up to the last moment practically unlimited possibilities of correction, interposition, alteration, exchange, making-up, equipment, ornamentation, and so forth, and permit of supervision in advance, and also the pulling of fluently readable and correctable galley proofs or other proof impressions in any desired number, and in a form which already approximates to that of the ultimate printed product.

The reproduction of any desired text in the way of ordinary typography is based on the individual type characters, which embody the particular letter image on a little rectangular prismatic block of lead. The individual parts both of the letter images and of the parts of the little lead block that are not to be printed stand in an accurately ascertained ratio to one another and to the whole, in order that it may be possible to assemble the individual characters into words, lines, and whole pages in an accurate and firm manner, exchange them, and then take them apart again, distribute them, and re-assemble them into fresh pages. The abovementioned rules of proportion also apply to all the blank material, which is required for the assembling of a forme surface ready for printing. The systematic articulating thus yielded imparts to the lead forme, besides the capacity for putting firmly together and taking apart, also a certain mobility and convertibility, by means of which, at any stage of the forme, it is possible to comply with those practical requirements, such for example as ordinary or author's corrections, brush proofs, making-up, and the like, which are liable to occur right from the manuscript to the finished book.

In the case of the forme product of the linecasting machines the articulation goes in fact only as far as the lines, but the typographic rules are in other respects obeyed without modification.

In photographic type composing there are several difficulties to overcome in order that the really indispensable articulation may be obtainable. One difficulty arises for instance from the fact that the type stencils never leave their carrier and can therefore never really be individually removed or displaced. Another difficulty resides in the fact that the photographically reproduced images of the printing characters no longer admit of being displaced on the sensitized forme carrier, and furthermore that the final product of the photographic type composing, namely the surface of the forme, is as a rule a photographic image remaining inseparably coherent. Yet another, and not the least difficult, originates from the fact that in photographic type composing, there is really no blank material, whereas in ordinary typography it is just the non-printing parts that represent the fitting means. In addition to this, the operator in photographic composing sees neither the type stencils nor the forme, notwithstanding the fact that he has to control the forme surface just as accurately as an ordinary compositor.

Now this invention comes in just where it is a question of incorporating stepwise, in lines or other making-up units, which in themselves are already "ready for printing", by way of partial photographic reproductions, in the photographic image of the surface of the forme, and the invention proposes to allot the individual making-up units, already in themselves ready for printing, to the individual photographic reproductions thereof, at first to those individual loose carriers which are each completely provided with precision means, which suffice for the manipulation and also for the mechanical positioning and fixing of the making-up unit carriers according to a definite system of two co-ordinates.

By "ready for printing" is to be understood already ready for reproduction, that is to say, ready for multiplication according to the rules of typography. By "making-up units" are to be understood those elements of the printing image, which, just as they are, can be correctly photographed directly in different positions within the limits of the photographic image of the surface of the forme. The making-up units that are in themselves ready for printing, therefore, need no further treatment beyond the mere photographic arranging thereof in the photographic image of the surface of the forme.

As hereinbefore already indicated, it is known in itself, that the photographic image of the surface of the forme, in photographic type composing, is not directly photographed stepwise from the individual characters, but from primary photographic composition products, for instance from lines, and the systematic separation of units suitable for direct introduction into the photographic image of the forme surface into individually displaceable loose pieces now involves however a new operation, in which the allotting of the making-up units to their carriers, which is regulated according to exact proportions, is to be equally followed right from the production of the first image of a printing character onwards, irrespectively of whether the making-up units themselves are likewise photographed or are produced in some other way. The production of the making-up units themselves remains in other respects unaffected. At the cost of the proposed new operation there is however to be purchased an articulation resembling that of the line-composing machine and also a possibility of accurate assembling of the forme, notwithstanding the fact that the surface of the forme in photographic composing is not directly composed at all by assembling the line characters, and notwithstanding the fact that the fitting surfaces of the line carriers of line-casting machines are worked, as is known, according to a system of three co-ordinates.

In photographic type composing a system of two co-ordinates is sufficient, because the third co-ordinate of the adjustment of the line carrier or the like, which is perpendicular to the projection window, is always given by the adjustment of the objective lens, and can be fully released from the particular making-up unit carrier, itself, as a purely optical factor. In addition to this it is to be taken into consideration that these making-up unit carriers are in practice predominantly film strips or other light-sensitive image carriers, which can be easily seen through, and show a uniform thickness, and furthermore that the third co-ordinate in question will only have a part to play in distortion images at most, because sharp adjustment in projection is in general self-evident.

The said precision means offer a trustworthy guide for manipulating at will the making-up unit carriers, and, through the medium thereof, also the making-up units themselves, in relation to the impression surface or to some other plane or even cylindrical surface, and also for clamping the same in photographing position, for instance in the projection window, by mechanical means, and in general for enabling them to be individually displaced accurately by hand or mechanically towards predetermined positions in a regular surface. They also provide a handle or support for arranging the associated making-up unit carriers in rows as required and replacing one by the other, besides enabling other similar operations to be performed, like those called "collecting the lines on the galley", "tying up", or "imposing", and so forth in the case of a lead forme. The system of co-ordinates of the precision means of the individual loose making-up unit carriers is referred collectively to the particular making-up unit itself, for instance to the image of a line photographically set up on a strip of film, in order that one may be guided directly according to the making-up unit concerned.

Figure 1:
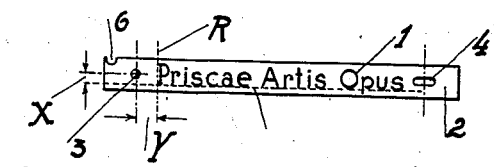
Figure 2:
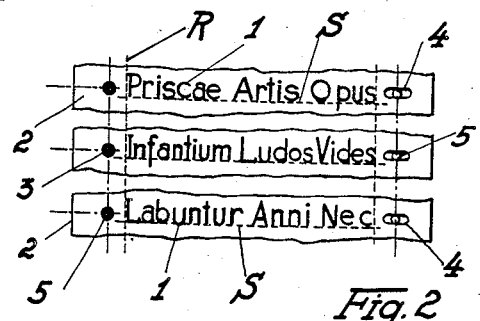
Figure 2 shows an arrangement of a plurality of such making-up unit carriers in plan.

According to Figure 1 the making-up unit 1, which may be the photographic image of one line, is allotted to a making-up unit carrier 2, consisting of a strip of film. This carrier is provided with precision means consisting of two holes 3 and 4, one at each end of the making-up unit carrier 2. The two holes 3 and 4 define a straight line, and the line S, on which the characters stand, is parallel to the line passing through the centers of the holes 3 and 4. The second decisive co-ordinate of the position of the photographic image of the line of type is obtained from the determination of a commencement line, for instance of the left hand margin line R. These measures ensure parallelism, and also ensure straight margins for the lines of type arranged ready for printing in column form, that is to say, in general, lines of equal length arranged one under the other, as shown in Figure 2. In this figure it has been indicated in a somewhat exaggerated manner that the edges of the strips of film may not also prove uniform, as they remain immaterial as regards the precision means.

The said precision means offer from the internal surface of the making-up unit carrier 2 the manipulations for an accurate co-ordinate adjustment of the photographic image of the making-up unit 1 in the projection window or aperture of that reproduction device by means of which the making-up units in question are to be photographically introduced step-by-step into the photographic image of the surface of the forme. Since the particular relative position of the light-sensitive forme surface carrier in relation to the projection window is always known from the relative adjustment of the reproduction apparatus, an adjustment of the making-up unit carrier 2 based upon the co-ordinates of the precision means in the projection window will suffice for photographically reproducing the particular making-up unit 1 on the basis of the transmission ratio of co-ordinates given by the optical system and by the mechanism of the reproducing apparatus with a mechanical accuracy even without visual adjustment of the light-sensitive forme surface carrier at predetermined positions.

It is not absolutely essential to set up the making-up unit 1 itself by means of photographic type composing, for instance by effecting the photographing character by character. The making-up units 1 themselves admit of being produced in any desired manner, for instance by means of printing. On the lines of the present invention everything may figure as a making-up unit which can be photographed or projected.

The hole 4 is elongated in the direction of the length of the strip of film, so that the making-up unit carrier is only made fast at its left hand end, even when the two holes 3 and 4 are each engaged by a corresponding round centering pin 5. The strip of film can expand and contract freely in the direction of the length of the line in consequence of the elongated hole 4, without impairing the accuracy of the making-up units 1, because it is to be assumed that equal pieces of film expand and contract equally in practice, and because the pieces of film used in this invention are always comparatively short.

The making-up unit carriers may be provided with precision means consisting of at least two abutting edges, the directions of which intersect one another, and which then co-operate with corresponding abutments in the projection window or the like. Such abutting edges, the directions of which preferably intersect one another at 90°, are intended to facilitate the stratification of the making-up unit carriers in a regular pack.

Figure 3:
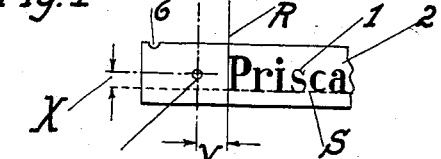
Figure 3 shows the left hand end, broken away, of the making-up unit carrier of Figure 1 on a larger scale, also in plan.

Figures 1 to 3 show that the making-up unit carriers 2, outside the region of the making-up units, and outside their precision means, have at both ends dragging extensions, which each belong to two flap-like covering positions located side by side. The object of these extensions will be explained hereinafter.

The vertical distance X of one outermost longitudinal co-ordinate, such as the writing line S, and also the vertical distance Y of one outermost transverse co-ordinate, such as the left-hand marginal line R of the making-up units 1 on their carriers 2, is always equally dimensioned by a precision means of the particular making-up unit carrier 2, for instance by the hole 3, which is located nearest to one of the two co-ordinates R and S in question. This measure is intended to ensure the requisite equalization not only of the associated making-up unit carriers 2, but in general of all the making-up unit carriers 2 under consideration, in a manner which can be easily maintained and directly supervised.

The precision means described open up the possibility of being able to manipulate or fix the position of the making-up units 1 even outside their photographic reproduction position, which will for example be requisite in the case of pre-arrangement, alteration of text, making-up, and so forth. The making-up units will for instance be individually grasped and mechanically manipulated according to the measure of the precision means of their loose individual carriers. The object of this is to obtain the advantage that the exactness of the co-ordinates, which forms the fundamental position for the movability and convertibility of the photographic forme, is automatically transmitted to all possible phases of photographic type composing, and furthermore that the mechanizing of the individual operations in the case of complete agreement of the precision means with one another is facilitated.

By the mechanical requisitioning of the making-up unit carriers which may possibly occur in this connection the exactness thereof will obviously suffer no abatement, on the one hand because with each making-up unit carrier work is only mostly done a few times altogether, and on the other hand because even this can be accomplished with the utmost carefulness.

The making-up unit carriers 2 may each be provided with one or more distinctive signals 6 (Fig. 3) or else with any convenient elements for a mechanical, electrical, or pneumatic control, or the like, for the purpose of ensuring the smoothness of working and the correctness of phases of the operations occurring.

In Figure 11, is shown a roll 7 of film, which carries a plurality of making-up units 1 collectively. The film roll 7 is subdivided from one making-up unit to the next into loose individual pieces 2 before the photographic development of its latent images. Figure 11 indicates the making-up units 1 for the sake of clearness, notwithstanding the fact that the same only become visible after development. The object of the said subdivision is to make the development and other photographic treatment of the making-up units, produced as photographic images and preferably set up photographically, independent of the operation of setting, which is advantageous having regard to the fact that the development and so forth proceeds in general far more quickly than the photographic composing, and because the latter may be delayed or interrupted at any time without thereby affecting the wet treatment of the other light-sensitive making-up unit carriers, or even interrupting the development and so forth of a line half way through.

The subdivision in question is best effected in the photographic type-composing machine that sets up the making-up units concerned, whereby the complications and losses of film arising from the threading of spools are obviated, and the widest possible mechanical uniformity in the subdivision is obtained. In order to enable the available mechanical exactness to be utilized as extensively as possible, the individually separated making-up units, at the time of the separation thereof, are at the same time perforated and provided with drag extensions, abutting edges, or else with signalling means or controlling elements.

The severed making-up units are then photographically developed and completed individually in a loose condition. The object of the individual treatment is to make the various stages of the photographic work independent of one another and to facilitate the mechanization of the wet and dry treatment. The making-up units are arranged in regular individual packs before or after the photographic or other treatment, so that they can be kept in order and stored according to the matter to which they relate. They are warehoused as required in the neighbourhood of the photographic reproducing position thereof, so that they are handy for incorporation in the photographic image of the forme surface.

The production of a photographic image of a forme surface according to the invention will now be more fully described with reference to book printing, as shown in Figures 10 and 12, where the making-up units are photographically set up in the form of photographic images.

The compositor receives the manuscript 8. According to the latter, he sets up single-line making-up units 1, ready for printing in themselves, in the photographic composing machine indicated by 9, these units, each in the form of photographic images of lines in themselves ready for printing, and according to the measure of associated precision means, being uniformly allotted to individual loose making-up unit carriers 2, consisting of film strip. The making-up unit carriers 2 may in case of need bear on their margins consecutive numbers or other indications of order, and are arranged on a plate 10 without regard to any ultimate line placing in the forme surface photograph to be prepared, preferably in a constant division in a preliminary forme piece. The latter already shows a column form and allows the forme to be inspected in the usual manner. The making-up unit carriers 2 are simply slipped on to the pins 5 in the plate 10 by their holes 3, 4, shown in Figures 1 to 3, so that in their arranged position they are easily releasable and exchangeable, and yet are accurately secured. The plate 10 is pierced with slots 11 at the positions covered by the making-up units 1 in order that the preliminary forme piece 1, 10, may be able to deliver, by contact copying or other photographic means, so-called galley slips or proofs 12, on which the corrections can be marked even directly between the lines. Figure 10 also indicates that a defective line photograph 1' is removed and replaced by a correct line photograph 1'', which has been subsequently re-set in the photographic type-composing machine 9. The arrows indicate the sequence of the operations.

After the correction of the preliminary forme piece, 1, 10, the photographic making-up is effected. Figure 12 shows an example of apparatus suitable for mechanical making-up. This is nothing more nor less than a photographic reproduction camera with an objective lens 13. The light-tight sides of the camera are not shown. The preliminary forme piece 1, 10, is fed forward in the object plane in such a manner that one line after the other passes into the projection window, this occurring exactly in a position which is predetermined with respect to the precision means of the making-up unit carriers in question. Since the division of the making-up unit carriers 2 on the plate 10 is equal, the preliminary forme piece can also be fed forward mechanically. The intermittent feeding of the preliminary forme piece 1, 10 is effected step-by-step by an exposure, not shown, and the projection image of the making-up unit 1 that is at any particular moment in the projection window, is accordingly exposed to the light-sensitive forme surface carrier 14, which is likewise fed forward stepwise in the direction of the arrow in conjunction with the feeding of the preliminary forme piece. Dotted lines indicate the pencil of projection rays. The length of feeding of the light-sensitive forme surface carrier 14 and the magnification by means of the projection are adjusted in such a manner that the final photographic image of the forme surface on the carrier 14 is of the desired size of type and of the desired line spacing.

The two Figures 13 and 14 show that in the case of a jobbing forme the procedure is similar to that which has just been described in connection with Figures 10 and 12 with regard to a bookwork forme. The compositor receives the draft 8', according to which he sets up the straightforward parts of the text in the photographic composing machine 9 in the form of making-up units 1 upon individual loose making-up unit carriers 2 of film strip. The figured portions, tail pieces, and other ornaments and markings are taken from two fount cases 15 and 16, where they are stored ready for use in the neighbourhood of the working position, likewise in the form of photographic images of making-up units, in themselves ready for printing, provided on individual loose making-up unit carriers 2 according to the measure of the corresponding precision means. The various making-up unit carriers 2 are arranged on the plate 10 into a preliminary forme piece, from which a photographic print 12' is obtained as a proof impression. A defective line image 1' is eliminated upon correction and replaced by a re-set line image 1''. The preliminary forme piece 1, 10 is again reproduced stepwise in the manner hereinbefore described to provide a final forme surface photographed on the carrier 14'.

The window through which the projecting takes place in the reproduction apparatus is provided, for the purpose of guidance and adjustment according to one or more co-ordinates, with pre-arrangers adapted to be fed forward mechanically, and also with semi-mechanical or merely manually operable pre-arrangers of the making-up unit carriers, or else with any desired individual making-up unit carriers. The guiding and adjusting means of the projection window and the forme carrier 14 can be slid to and fro at will in the projection position in relation to one another along at least two intersecting co-ordinates. In addition to this the guiding and adjusting means of the projection window, with or without the latter, and the forme surface carrier 14 may be rotatable in any position, so that between the projection window and the forme surface carrier 14 the manifold proportional movements can be accomplished which occur in the case of bookwork, or even in the case of jobwork. The arrows in Fig. 14 show that the provisional forme piece 1, 10 moves in one direction, whereas the light-sensitive forme carrier 14 moves in a number of different directions.

A making-up unit arranger according to Figures 16 and 17 consists of two halves receiving between them the making-up unit carrers introduced, and preferably consisting of bands or strips 17 and 18, each of which is pierced with a number of making-up unit slots 11 which match one another, and of which the lower band 17 is provided with pins 5 for fixing the position of the making-up carriers 2 by their holes 3 and 4, and for fixing the position of the covering strip 18 with corresponding round holes. The lower strip 17 also carries a few press studs 19, which engage in holes 21 in the cover strip 18, provided with snap springs 20, shown in Figure 21, and therefore fix the two strips 17 and 18 in their working position. The two halves 17 and 18 of the making-up unit arranger are flexible strips of steel or the like, which can be calibrated, and yet are light and accurate pre-arrangers. The two strips 17 and 18 are pierced with gripper holes 22 or other means for the mechanical feeding of the pre-arranger as a whole. The same are provided in dependence upon the precision means of the making-up unit carriers to be pre-arranged, as a result of which the mechanical feeding of the pre-arranger can be made automatic. The pre-arranger may be provided with one or more signalling elements, or with controlling elements, which re-act upon the manipulation of the pre-arrangers or upon the mechanical actuation thereof. The signalling means in question may for example be similar in construction to those described in connection with Figure 1 or Figure 3, and the controlling elements in question may for example be riders, special holes, tappet pins, abutments, contacts, and so forth, which precede the individual making-up unit slots 11, in such a manner that they control in any desired manner, mechanical, pneumatic or electrical for example, a ratchet or locking device, which only permits the stoppage of the feeding movements occurring during the photographic reproduction after each individual exposure of the making-up units to be exposed, has been completed. Such ratchet devices are actuated by the feeding member of the pre-arranger or of the carrier of the provisional forme piece or of the forme surface, or are positively coupled thereto. Another safety device, particularly for bookwork purposes, is obtained by the fact that by the feeding mechanism of the pre-arranger or of the carrier of the preliminary forme piece or of the forme surface an end switch, known in itself, is driven, which automatically stops the feeding mechanism in question after a definite number of feeding movements, simply with the help of the controlling elements mentioned. The constructional examples of such safety devices are hereinafter more fully described in conjunction with Figure 22.

The feeding means and the signalling devices or controlling elements of the making-up unit arrangers are separated from the position-fixing means thereof, and are arranged outside the region of the making-up unit carriers introduced, so that the mechanical actuation of the pre-arrangers does not affect the making-up unit carriers themselves at all.

The sub-division of the pre-arranger into two halves is intended to facilitate the putting in and taking out of the making-up unit carriers 2. Further conveniences are intended to be obtainable owing to the fact that one half is divided into individual pieces, each of which only covers one making-up unit position or a smaller or larger group of such positions. Figure 15 shows an example in which the cover strip consists of individual pieces 18', which permit of direct exchanging of the individual making-up unit carriers 2. For this purpose the invention provides for the pre-arrangers, consisting of two continuous halves, a separate device, which also enables them to be supervised.

In Figure 15 there will be seen, on the margin of the pre-arranger strip 17, a rider 109 in the form of a resilient terminal, which, when the pre-arranger is being fed forward in the direction of the arrow, presses a fixedly arranged resilient contact tongue 110 against a contact member 111, and thus closes an electric circuit, which is indicated by two conductors 112 and 113, as soon as the rider 109 arrives at the position of the contact 110, 111. The circuit through the two conductors may then energize any convenient actuating means. If this circuit releases for instance the stoppage of the mechanical feeding means of the pre-arranger, the mechanically fed pre-arranger will automatically remain stationary at the making-up unit carrier 2 at which the rider 109 has been clamped in advance to the margin of the pre-arranger strip 17.

The abovementioned checking or supervising device consists according to Figures 18, 19 and 20 of a slide track 23, which serves for guiding the pre-arranger, and is provided with one or more positions 24, at which provision is made for illumination by transmitted light, preferably in the bottom. The pre-arranger is pushed, forward intermediately in the slide track 23, and so during its progress the lines of lettering, and so forth, can be successively observed at the illuminating position 24. In the supervising device, however, it is also possible to work with the cover strip 18 removed; for the cover strip 18 is narrower than the lower strip 17, and can be removed from the latter in case of need even when the pre-arranger is already mounted in the slide track 23. The drag extensions of the making-up unit carriers 2, which have been mentioned before, are so long that they project on both sides (Fig. 17) underneath the cover strip 18 so far that they are covered by the rails or ledges 25 of the slide track 23, even when the cover strip 18 is removed. The supervising device now in its turn replaces the upper half 18 of the pre-arranger, since it retains the making-up unit carriers 2 in their inserted position (Figs. 19 and 20) merely with the help of the lower half 17 of the pre-arranger, without thereby hindering the displaceability of the mounted pre-arranger. In the slide track 23 there are one or more ventilating positions for the making-up unit carriers 2, which are preferably provided in each case above an illuminating position 24. According to the example illustrated in the drawings the ventilating position consists of two transverse sliders 26, sliding in guides 27. Now when a defective making-up unit is found, the sliders 26 are retracted laterally, as a result of which the making-up unit carrier 2 in question becomes entirely free, and can be removed from the pre-arranger. Fresh making-up unit carriers can similarly be introduced individually afterwards into the pre-arranger. Fig. 18 shows the transverse slides 26 in their closed position, and Figure 19 shows them in their retracted position.

The constraint of the precision means and the necessity for employing pre-arranger aids, involve in any case restrictions in the provision and manipulation of the making-up units, but in other respects they leave a free hand for the actual photographic operations. Making-up elements, which only yield, from their continuously repeated photographic reproductions, a continuous making-up unit or other portion of the forme surface image, may according to the invention be allotted to individual carriers and manipulated in the manner of these making-up units. In this way, for example, an ornamental flourish, or headpiece for example, can be introduced into the forme surface image from its smallest element, if the image or some other copy of the element in question is produced as a making-up unit in the sense of this invention, introduced, and photographed stepwise into the forme surface by the aid of a suitable reproduction device in associated continuations.

Figure 4:
Figure 4 shows a broken piece of a making-up unit carrier, representing a clear transparent letter E on a black ground.
Figure 5:
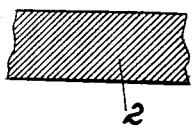
Figure 5 shows a broken piece of a making-up unit carrier representing a transparent hatched touching insertion.
Figure 6:
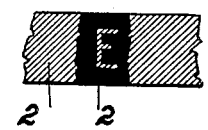
Figure 6 shows the two pieces according to Figs. 4 and 5 superposed on one another.

A plurality of making-up units or one or more making-up units and one or more touching insertions can be reproduced photographically at the same time, or if preferred one after the other, on the light-sensitive forme surface carrier, one upon the other, so that different impressions can be obtained from one and the same making-up unit. Figure 4 shows for example an image of a smooth E on the making-up unit carrier 2. Figure 5 shows another making-up unit carrier 2, with the image of a hatching. Now if these two making-up unit carriers are superposed according to Fig. 6 and reproduced both at once, the hatched E, shown in Fig. 6 is obtained, without the original image shown in Figure 4 having had to be altered.

Figure 7:
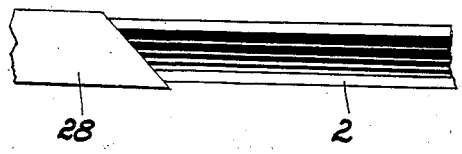
Figure 7 shows a broken piece of a making-up unit carrier representing a black line ornament with a light-proof partial covering, likewise broken.

Figure 7 shows an example of how one end or the other of the making-up units can be covered up in a light-tight manner during the photographic reproduction thereof. The making-up unit carrier 2 in question is provided with the image of a group of lines. It may here be observed that this image, like the other images shown in the other figures, is represented for the sake of clearness as a positive and not as a negative. The left-hand end of the said line image is covered with an opaque plate 28, the edge of which intersects the image of the group of lines at 45°. In this way there may be obtained from the straight lines ornamental corners of a similar character in the forme surface image, as shown for example in Figure 8. Not only the ends but also one or more other parts of the making-up units or elements thereof may likewise be covered up by using the precision means provided according to the invention.

The opaque coverings in question also admit of being regulated. Figure 9 shows an example of an adjustable screen. The casing 29 is displaceable on rails 30 along the making-up unit carrier 2, and can be made fast in any position by means of a set screw 31. The actual screen 32 is rotatable in a circular sleeve 33, and is provided with an extension 34 for the purpose of improving the circular guidance. The cutting edge 35 of the screen 32 intersects the axis of rotation of the screen. The latter is provided on its periphery with notches 36 in which the free end of a snap spring 37 engages. The screen 32 accordingly admits of being adjusted in the sleeve 33 in various positions, and of being secured in the selected position by the snap springs 37.

Figures 22 and 23 show examples of reproduction apparatus for carrying out the photographic type composing process according to the present invention. These devices, which may be regarded as photographic cameras of which the opaque walls are not shown, mechanize the composition of the photographic image of the surface of the forme from partial reproductions.

The simpler Figure 23 merely shows how the stepwise feeding movements of the pre-arranger may be converted into those of the light-sensitive forme surface carrier with an adjustable mechanical transmission. The pre-arranger, not shown, is secured in a mounted condition on the frame-like slide 38, which slides in the guide 39. The latter is pierced by the projection window 40. The slide 38, together with the pre-arranger, is fed forward stepwise in front of the projection window 40, and the particular making-up units located there from time to time are illuminated, and are projected by means of an objective lens 13 on to a light-sensitive forme surface carrier, not shown, which is secured to the slide 42 sliding in the guide 41. The two slides 38 and 42 are connected with one another by means of link arms 43, 44 and a lever 45. The lever 45 acts as a two-armed lever, the pivot 46 of which is longitudinally displaceable by the aid of a slidepiece 47, and can be secured in any position by the aid of a set screw 48. The individual feeding movements of the slide 38 and the pre-arranger are accordingly communicated, in a ratio determined by the adjustment of the pivot 46, to the slide 42 and to the light-sensitive forme surface carrier.

Figure 22 shows another transmission means, likewise adjustable as regards the transmission ratio, in conjunction with safety devices already mentioned in the course of the foregoing description. A main shaft 49, continuously revolving in the direction of the arrow, terminates in a crank 50, and the latter, through a connecting rod 51, drives a rod 53 reciprocating in a guide 52. The rod 53 terminates in a sleeve 54, in which a resiliently mounted feeding pin 56 can move up and down easily. The spring 55 constantly tends to move the feeding pin 56 downwards, that is to say, to press it into each of the engaging holes 22 in the pre-arranger 17, 18. The feeding pin 56 is bevelled in a rearward direction at the lower end in such a way that during the backward stroke of the rod 53 it automatically rises out of the engaging hole 22 into which it has dropped, and swings idly backwards. Each revolution of the suitably dimensioned crank 50 therefore advances the pre-arranger 17, 18 in the guide 57 one making-up unit graduation farther on in the direction of the arrow. The feeding pin 56 can be drawn up by the aid of an electromagnet 58, by means of an armature 59 mounted thereon, the length of which exceeds the length of the stroke. The method of working of the magnet 58 is described below. The main shaft 49 is connected by way of two chain wheels 60, 61 and a chain 62 with an intermediate shaft 63, the transmission ratio between the two shafts being 1:1. The rotation of the intermediate shaft 63 is transmitted by the aid of a movable crank 64, a connecting rod 65 and a freely running cam 67 pivoted to a crank 66 mounted loose, to an auxiliary shaft 59, to which a disc 68 is keyed. The shaft 69 in its turn, through the medium of a friction clutch 70, a pinion 71, and a rack 72, drives a slide 74, which slides in a guide 73, the light-sensitive forme surface carrier 14 being mounted on this slide. The swinging movements of the rod 53 are therefore also transmitted to the forme surface carrier 14, but only in one direction, and with a transmission ratio adjustable at will.

The making-up units 1 are illuminated in the projection window of the guide 57 in succession from a source of light indicated as a glow lamp 75, and projected through the objective lens 13 on to the forme surface carrier 14. The intermediate shaft 63 by the aid of bevel wheels 76, 77 and a shaft 78, sets a round shutter 79 in rotation in the direction of the arrow. The aperture 80 of the shutter 79 is so adjusted that the projections only pass to the forme surface carrier 14 when the pre-arranger 17, 18 is stationary.

The problem is also to influence the driving of the pre-arranger 17, 18, and also of the slide 74, in such a manner that the interruption of the feeding of one of them will bring with it the interruption of the feeding of the other, and that the feeding movements can always only be interrupted after the exposure has been completed. For this purpose there co-operates with the magnet 58 a second magnet 81, which, when excited, attracts the armature 82 to itself, and thereby opens the friction clutch 70. The source of current for the two magnets 58 and 81 is indicated by two poles 83 and 84. From the positive pole 83 a conductor 86 leads through a switch 85 to one terminal of the magnet 81, and another conductor 87 leads in its turn to one terminal of the magnet 58. From the other terminal of this magnet a conductor 88 leads through a contact tongue 89, a cam disc 90, and a circular disc 91 (both discs being mounted on the main shaft 49) and then through a sliding contact 92 and a conductor 93 back to the negative pole 84. From the conductor 88 a conductor 94 branches off to the other terminal of the magnet 81.

The aforementioned conductors are in short so arranged that one terminal of each of the two magnets 58 and 81 is directly connected with the switch 85 and from here to the positive pole 83, while the other two terminals thereof are connected through the contact tongue 89 and the cam disc 90 to the negative pole 83. When the switch 85 is open, as shown in Figure 22, the supply of current is interrupted, so that the two magnets 58 and 81 remain inoperative. In this position the feeding mechanism of the pre-arranger 17 and 18, is maintained in regular operation by the continuously revolving main shaft 49, this motion being transmitted through the medium of the adjustable means hereinbefore described to the feeding mechanism of the slide 74 of the forme carrier 14. In order to stop one or other of the feeding mechanisms the contact 85 has to be closed. The conductors described form a mutual positive connection in the stoppage of the two feeding mechanisms in order that neither the pre-arranger 17, 18 nor the forme carrier 14 shall be unintentionally fed forward idly; the closing of the switch 85, however, is not in itself sufficient to stop the feeding mechanisms, because the contact tongue 89 and the cam disc 90 form a time switch, which only permits current to flow to the two stop magnets 58 and 81 at times. The cam disc 90 is so shaped and adjusted that the passage of a current is only possible in the phase of the termination of an individual feeding movement of the pre-arranger 17, 18, and hand-in-hand therewith the rotation of the round screen 79 is arranged in such a manner that the phase of the passage of current is only to occur after each individual exposure of a making-up unit 1 is terminated. When the switch 85 is closed, therefore, and during the continuance of conductive contact between the contact tongue 89 and the cam disc 90, the magnets 58 and 81 are both excited. The magnet 58 draws the feeding pin 56 upwards, and the magnet 81 opens the friction clutch 70, so that both the pre-arranger 17, 18 and the forme carrier 14 remain stationary. The stoppage is accomplished on the one hand by the feeding pin 56 or some other engaging means of one feeding mechanism, and on the other hand by the end portion 70, 71 of the other feeding mechanism, while the remaining parts of the feeding mechanisms in question may continue to run. The inert masses of the apparatus therefore do not have to be brought to a standstill at every stoppage, similarly also the exposure need not necessarily be interrupted every time. The feeding mechanism described also actuates an adjustable end switch or limit switch for the automatic stoppage of the feeding mechanism after a predetermined number of feeding movements. Such an end switch may for example give good service in bookwork, where it automatically interrupts the photographic making-up after the attainment of the selected number of lines on each page. According to Figure 22 a ratchet wheel 95 is rotated in the direction of the arrow through one tooth division each time the magnet 96 draws downwards the armature 97 loosely supported upon the ratchet wheel shaft, and with it the pawl 98. One terminal of the magnet 96 is connected by a conductor 99 with the positive pole 83, and the other terminal is connected by way of a conductor 100 and a contact tongue 101 to a cam disc 102 mounted on the main shaft 49, and from there is earthed by connection to the frame through the main shaft 41 and the round disc 91, being then connected through the sliding contact 92 and the conductor 93 to the negative pole 84. The magnet 96 is excited every time the contact tongue 101 comes into conductive contact with the cam disc 102. The cam disc 102 is so shaped and adjusted that this contact takes place after each individual feeding movement of the pre-arranger 17, 18. The ratchet wheel 95 is therefore ultimately advanced through one tooth division after each individual feeding movement of the pre-arranger 17, 18. The ratchet wheel 95 has holes 103 into which an abutment pin 104 can be inserted. This pin, after a certain rotation of the ratchet wheel 95, reaches a bell-crank lever 106 pivoted at 105, and by pushing the latter away it brings two resilient contact tongues 107 into contact with one another. This accordingly closes a shunt conductor 108, this being equivalent, as Figure 22 shows, to closing the stop switch 85. The automatic stoppage of the two feeding mechanisms admits in this manner of being regulated by inserting the abutment pin 104 in an appropriate one of the holes 103.

The slide 42 or 74 of the forme carrier 14, and also, it may be, the slide 38 (Fig. 23) of the pre-arranger 17, 18, are pushed back idly out of the end position into the initial position like the paper carriages of typewriters, either by hand or by the aid of mechanical appliances, known in themselves.

The light-sensitive forme carrier 14 does not have to be so narrow as the examples illustrated indicate. It may if necessary comprise several columns, or all the pages of a rather large sheet, and the rotatability, already mentioned, of the guiding and adjusting means of the projection window and of the slide of the forme carrier involves the various pages being capable of being reproduced just in that position and distribution that is called for by the correct sequence on the sheet of paper when folded. The reproduction apparatus may have more than one projection window, and may even have various projection windows which can be brought into the projection position in turn. Several projection windows of the same apparatus may each guide a separate pre-arranger. These measures are intended to have the advantage that the making-up unit carriers of illustrations, page numbers, headings, inscriptions that have to be repeated frequently, and so forth, can be prepared separately from the straightforward matter, and, after adjustment of the projection windows in question, can be incorporated into the photograph of the forme surface as required. A further advantage is that isolated lines or the like can be introduced anywhere without re-arranging the pre-arranged straightforward matter. For this purpose pre-arrangers may be most advantageously employed in which not only the cover strip 18 but also the lower strip 17 is subdivided into isolated pieces.

The making-up units 1 are prepared in two or more standard sizes, and are enlarged or reduced to definite degrees between definite limits during the photographic reproduction thereof or during the photographic reproduction of the forme as a whole. In this manner those limits of photographic enlargement or reduction which are still permissible while maintaining the typographic proportions of the printed images do not have to be exceeded. The various standard sizes are graded in such a way that the grades of magnitude yielded by the given limits of enlargement or reduction of the successive steps merge into one another without any break. There will therefore be a few normal standards, but by the aid of these it will be possible by means of photographic projection to print all sizes at will, that is to say, an infinite number of intermediate grades. Two or more standard sizes of making-up units 1 admit of being allotted amongst themselves to carriers of equal breadth, so that while maintaining the same precision means the same pre-arrangers and other appliances can be used for different standard sizes.

To sum up, it will now be found that photographic type composing needed an improvement with particular reference to the phase of the composition of the forme surface image from photographic partial reproductions. Elementary photographic composition to be accomplished by the aid of stationary type stencils in the manner of type is restricted merely to the production of individual making-up units ready for printing, insofar as it is preferred to have these likewise produced by the photographic compositior. In the sense of this invention the actual photographic composing is intended to pass to a higher stage, where the compositor mounts making-up units which in themselves are already ready for printing. In consideration of this higher stage it remains substantially immaterial how the making-up units themselves are produced, because by way of the partial reproductions in question everything that admits of being photographed at all can be accurately photographed stepwise into the forme surface image. The presumption underlying the possibility of accomplishing everything with a mechanizable uniformity and without previous or subsequent preparation is the adoption of the precision means described in conjunction with the individual loose making-up unit carriers. These features govern the whole operation of photographic composing, including for example the production of making-up units, the pre-arrangers of the making-up unit carriers, the structure, the adjustment, and the operation of the reproduction apparatus, and other appliances. They provide an absolute and also a relative mobility of the forme; the former by the dissection of the forme into individual making-up units on loose making-up unit carriers, which permit a pre-arrangement, conversion and assembling at will, and the second owing to the fact that the individual projections of movable making-up units on to movable forme surface carriers, always permit of releasing and modifying the sequence and relative positions of the making-up units in relation to one another, which are determined in advance by the pre-arranging of the making-up carriers, without undoing the pre-arrangement itself. On the basis of this two-fold mobility it may well be said that this invention imparts to photographic type composing a sort of fluidity so to speak.

The finished forme surface image may be employed for printing in any desired manner. For instance a printing forme may be prepared from it by photo-mechanical means, and in this printing forme other printing formes may also be embodied in case of need. The distribution after printing or after completing the forme surface image consists essentially in merely arranging the making-up unit carriers in regular packs. For purposes of a new edition the forme surface image on the one hand will be available, and on the other hand also the making-up unit carriers arranged in packs, thus facilitating subsequent modifications of the text.

As compared with the composing work done on line-casting machines the main differences are that they are restricted to the collecting, fixing and depositing of the individual matrices, wherein they are still subject to a typometric constraint, and furthermore that the mere two-co-ordinate precision means according to this invention may even be protected in the making-up units themselves, and moreover that the pre-arranging according to the invention is rather free from the ultimate dimensions of the printed product, so that the most varied sizes of printed matter admit of being produced with the same pre-arranger and with the same feeding means.

What I claim is:

1. For photographic type composing in which the photograph of the surface of the forme is set up stepwise by means of individual photographic reproductions of making-up units which are in themselves ready for printing, individual make-up carriers, each provided with precision means for locating the making-up unit carriers according to a pre-determined two-dimensional system of co-ordinates, in position for being photographed on the surface of the forme.

2. For photographic type composing, making-up unit carriers as claimed in claim 1, in which the two-coordinate system of the precision means of a plurality of individual loose making-up unit carriers is related collectively to the particular making-up unit itself.

3. For photographic type composing, making-up unit carriers as claimed in claim 1, in which the precision means comprise two holes located at the ends of the making-up unit carriers at a pre-determined distance from one another.

4. For photographic type composing in which the photograph of the surface of the forme is fully set up stepwise by means of individual photographic reproductions of making-up units which are in themselves ready for printing, individual making-up carriers, each provided with precision means for locating the making-up unit carriers according to a pre-determined system of co-ordinates of two dimensions, in position for being photographed on the surface of the forme, the two-coordinate system of the precision means of a plurality of individual loose making-up unit carriers being related collectively to the particular making-up unit itself, and said precision means comprising two holes located at the ends of the making-up unit carriers, at a pre-determined constant distance from one another.

5. For photographic type composing in which the photograph of the surface of the forme is fully set up stepwise by means of individual photographic reproductions of making-up units which are in themselves ready for printing, individual making-up carriers, each provided with precision means for locating the making-up unit carriers according to a pre-determined system of co-ordinates of two dimensions, in position for being photographed on the surface of the forme, the two-coordinate system of the precision means of a plurality of individual loose making-up unit carriers being related collectively to the particular making-up unit itself, and said precision means comprising two holes located at the ends of the making-up unit carriers, one of which is shaped as a hole elongated in the direction of the length of the making-up unit carrier.

6. For photographic type composing, making-up unit carriers as claimed in claim 4, in which one hole is shaped as a hole elongated in the direction of the length of the making-up unit carrier.

7. For photographic type composing, making-up unit carriers as claimed in claim 1, in which the precision means comprise at least two fixed abutting edges each, the directions of which intersect one another.

8. For photographic type composing, making-up unit carriers as claimed in claim 1, in which the precision means comprise at least two fixed abutting edges each, the directions of which intersect one another at ninety degrees.

9. For photographic type composing in which the photograph of the surface of the forme is fully set up stepwise by means of individual photographic reproductions of making-up units already in themselves ready for printing, individual making-up unit carriers provided with precision means for locating the making-up unit carriers according to a pre-determined system of co-ordinates of two dimensions, in position for being photographed on the surface of the forme the two-coordinate system of the precision means of a plurality of individual loose making-up unit carriers being related collectively to the particular making-up unit itself and the making-up unit carriers having precision means comprising at least two fixed abutting edges each, the directions of which intersect one another.

10. For photographic type composing in which the photograph of the surface of the forme is fully set up stepwise by means of individual photographic reproductions of making-up units already in themselves ready for printing, individual making-up unit carriers provided with precision means for locating the making-up unit carriers according to a pre-determined system of co-ordinates of two dimensions, in position for being photographed on the surface of the forme the two-coordinate system of the precision means of a plurality of indivdual loose making-up unit carriers being related collectively to the particular making-up unit itself and the making-up unit carriers having precision means comprising at least two fixed abutting edges each, the directions of which intersect one another at ninety degrees.

11. For photographic type composing, making-up unit carriers as claimed in claim 1, said making-up unit carriers being prolonged beyond the region of the making-up units at both ends by means of drag extensions.

12. For photographic type composing, making-up unit carriers as claimed in claim 1, said making-up unit carriers being prolonged beyond the region of the making-up units and beyond the precision means at both ends by means of drag extensions.

13. For photographic type composing, making-up unit carriers as claimed in claim 1, each of the making-up unit carriers having at least one signalling feature.

14. For photographic type composing, making-up unit carriers as claimed in claim 1, each of the making-up unit carriers having at least one controlling means.

15. For photographic type composing, making-up unit carriers as claimed in claim 1, the perpendicular distance of the outermost longitudinal co-ordinate and the perpendicular distance of the outermost transverse co-ordinate of the making-up units on their carriers from that one of the precision means of the particular making-up unit carrier which is located nearest to the two outermost co-ordinates in question are always respectively constant in magnitude.

16. For photographic type composing, making-up unit carriers as claimed in claim 1, in which the two-coordinate system of the precision means of a plurality of individual loose making-up unit carriers is related collectively to the particular making-up unit itself, and furthermore the perpendicular distance of the outermost longitudinal co-ordinate and the perpendicular distance of the outermost transverse co-ordinate of the making-up units on their carriers from that one of the precision means of the particular making-up unit carrier which is located nearest to the two outermost co-ordinates in question being always respectively constant in magnitude.

17. A photographic type composing apparatus in which a photograph of a forme surface is compiled stepwise from individual photographic reproductions of making-up units allotted to individual making-up unit carriers, each completely provided with precision means, for manipulating and also for fixing the position of the making-up unit carriers according to a pre-determined system of co-ordinates of two dimensions, means for pre-arranging the loose making-up unit carriers, the said pre-arranging means consisting of two strip-shaped halves receiving between them the making-up unit carriers introduced, and the said halves both being pierced with making-up unit slots fitting together, and both being provided with means for fixing the position on the one hand of the making-up unit carriers with their precision means, and on the other hand of the pre-arranger halves in relation to one another.

18. A photographic type composing apparatus having pre-arranging means as claimed in claim 17, further comprising means for mechanically feeding forward the pre-arranging means.

19. A photographic type composing apparatus having pre-arranging means as claimed in claim 17, further comprising signalling features.

20. A photographic type composing apparatus having pre-arranging means as claimed in claim 17, further comprising controlling elements.

21. In the pre-arranging means claimed in claim 17 the separation of the position fixing means of the making-up unit carriers and the means for fixing the position of the halves of the pre-arranging means in relation to one another from the remaining equipment of the pre-arranging means, and the arranging of this remaining equipment outside the region of the making-up unit carriers introduced.

22. In the pre-arranging means claimed in claim 17, making at least one of the halves of the said pre-arranging means of flexible metallic strip.

23. In the pre-arranging means claimed in claim 17, making one of the halves of the said pre-arranging means narrower than the other.

24. In the pre-arranging means claimed in claim 17, subdividing at least one of the halves of the pre-arranging means into pieces which contain any desired number of making-up unit positions.

25. A photographic type composing apparatus in which a photograph of a forme surface is compiled stepwise from individual photographic reproductions of making-up units allotted to individual making-up unit carriers, each completely provided with precision means, for manipulating and also for fixing the position of the making-up unit carriers according to a pre-determined system of co-ordinates of two dimensions, means for pre-arranging the loose making-up unit carriers, and means for supervising the pre-arranging means, the said supervising means consisting of a slide track for the pre-arranging means, there being in the slide track at least one position at which the making-up units can be illuminated by transmitted light.

26. Means for pre-arranging loose making-up unit carriers as claimed in claim 25, the constructing of the slide track with ledges at the top projecting so far that they overlap the ends of the making-up unit carriers, which are located merely on one half of the pre-arranging means.

27. Means for pre-arranging loose making-up unit carriers as claimed in claim 25, further comprising, at one position therein, means for introducing and removing individual making-up unit carriers.

28. A photographic type composing apparatus in which a photograph of a forme surface is compiled stepwise from individual photographic reproductions of making-up units allotted to individual making-up unit carriers, each completely provided with precision means for manipulating and also for fixing the position of the making-up unit carriers according to a pre-determined system of co-ordinates of two dimensions, means for pre-arranging the loose making-up unit carriers, a projection window past which the pre-arranging means travels, means for photographically reproducing the individual making-up units as they assume a position at the projection window, a device for adjusting the unit carrier pre-arranging means in relation to the projection window in respect of at least one co-ordinate according to the nature of the precision means of the making-up unit carriers.

29. Means for pre-arranging loose making-up unit carriers as claimed in claim 28, further comprising equipping the side that receives the photographic object with means for mechanically feeding forward the pre-arrangers of making-up unit carriers according to the nature of the precision means of the latter.

30. Means for pre-arranging loose making-up unit carriers as claimed in claim 28, further comprising equipping the side that receives the photographic object with means for mechanically feeding the pre-arranging means of making-up unit carriers stepwise from one making-up unit to the next according to the nature of the precision means of the said carriers.

31. Means for pre-arranging loose making-up unit carriers as claimed in claim 28, further comprising equipping the side that receives the photographic object with means for rotating the photographic object in its own plane in any position.

32. Means for pre-arranging loose making-up unit carriers as claimed in claim 28, further comprising equipping the side that receives the photographic object with means for rotating the projection window in its own plane in any position.

33. Means for pre-arranging loose making-up unit carriers as claimed in claim 28, further comprising equipping the side that receives the photographic object with additional projection windows, and with means for bringing the projection windows into the projection position in turn.

34. Means for pre-arranging loose making-up unit carriers as claimed in claim 28, further comprising equipping the side that receives the photographic object with additional projection windows, and with means for bringing the projection windows into the projection position in turn, and furthermore equipping each of the said projection windows with separate devices for adjusting the unit carrier pre-arranging means in respect of at least one co-ordinate according to the nature of the precision means of the making-up unit carriers.

35. Means for pre-arranging loose making-up unit carriers as claimed in claim 28, further comprising equipping the side that receives the light-sensitive forme carrier with means for mechanically advancing the forme carrier according to the nature of the precision means of the making-up unit carriers adjusted in the projection window.

36. Means for pre-arranging loose making-up unit carriers as claimed in claim 28, further comprising equipping the side that receives the light-sensitive forme carrier with means for rotating the forme carrier in its own plane in any position.

37. Means for pre-arranging loose making-up unit carriers as claimed in claim 28, further comprising equipping the side that receives the photographic object with means for mechanically advancing the pre-arranging means of making-up unit carriers according to the nature of the precision means of the latter, and also equipping the side that receives the light-sensitive forme carrier with means for mechanically advancing the forme carrier according to the nature of the precision means of the making-up unit carriers adjusted in the projection window, and an adjustable transmission between the pre-arranger advancing mechanism and the forme carrier advancing mechanism.

38. Means for pre-arranging loose making-up unit carriers as claimed in claim 28, further comprising equipping the side that receives the photographic object with means for mechanically advancing the pre-arranging means of making-up unit carriers according to the nature of the precision means of the latter, and also equipping the side that receives the light-sensitive forme carrier with means for mechanically advancing the forme carrier according to the nature of the precision means of the making-up unit carriers adjusted in the projection window, and in addition a time switch positively connected with at least one of the advancing mechanisms and adapted to stop the advancing mechanisms exclusively after each individual photographic exposure of making-up units is completed.

39. Means for pre-arranging loose making-up unit carriers as claimed in claim 28, further comprising equipping the side that receives the photographic object with means for mechanically advancing the pre-arranging means of making-up unit carriers according to the nature of the precision means of the latter, and also equipping the side that receives the light-sensitive forme carrier with means for mechanically advancing the forme carrier according to the nature of the precision means of the making-up unit carriers adjusted in the projection window, and in addition a time switch positively connected with at least one of the advancing mechanisms and adapted to stop the advancing mechanisms automatically after a predetermined number of forward steps.

40. Means for pre-arranging loose making-up unit carriers, as claimed in claim 28, further comprising equipping the side that receives the photographic object with means for mechanically advancing the pre-arranging means of making-up unit carriers according to the nature of the precision means of the latter and also equipping the side that receives the light-sensitive forme carrier with means for mechanically advancing the forme carrier according to the nature of the precision means of the making-up unit carriers adjusted in the projection window and in addition a mutual positive connection of the two said advancing mechanisms with one another.

41. Means for pre-arranging loose making-up unit carriers as claimed in claim 28, further comprising equipping the side that receives the photographic object with means for mechanically advancing the pre-arranging means of making-up unit carriers according to the nature of the precision means of the latter and also equipping the side that receives the light-sensitive forme carrier with means for mechanically advancing the forme carrier according to the nature of the precision means of the making-up unit carriers adjusted in the projection window, and in addition means for stopping at least one of the two said advancing mechanisms at one end portion of the otherwise continuous drive of the advancing mechanism in question.

42. In photographic type composing in which the photograph of the surface of the forme is fully set up stepwise by means of individual photographic reproductions of making-up units already in themselves ready for printing, individual making-up unit carriers each completely provided with precision means, and an adjustable opaque screen for partially covering the making-up unit carriers, the said screen comprising a circular casing longitudinally displaceable at right angles to its axis, and a semi-circular screen plate rotatable in the casing and capable of being fixed in different positions therein.

EDMOND UHER.